United States Patent [19]

Doering et al.

[11] Patent Number: 5,324,164

[45] Date of Patent: Jun. 28, 1994

[54] FLUID ACTIVE DEVICE

[76] Inventors: John N. Doering; Lloyd D. Doering, both of 1048 Palatka Rd., Louisville, Ky. 40214; Michael N. Doering, 5411 Distler Rd., Louisville, Ky. 40258

[21] Appl. No.: 714,592

[22] Filed: Jun. 13, 1991

[51] Int. Cl.$^5$ .............................. F01D 17/16
[52] U.S. Cl. ........................ 415/150; 415/160; 416/156; 416/160; 416/167
[58] Field of Search .......... 415/148, 150, 151, 159, 415/160, 163, 165, 166; 416/147, 156, 160, 167

[56] References Cited

U.S. PATENT DOCUMENTS

| | | | |
|---|---|---|---|
| 2,985,427 | 5/1961 | Houghton | 415/163 |
| 2,994,509 | 8/1961 | Walker | 415/150 |
| 4,338,063 | 7/1982 | Nakanishi | 415/163 |

*Primary Examiner*—Edward K. Look
*Assistant Examiner*—Christopher Verdier

[57] ABSTRACT

A multiple vane, variable pitch, fluid active or reactive device to move or be moved by a fluid including first and second wheels each rotatable about its axis and the axes disposed in selected parallel offset relation. Aperatures provided in the first wheel receive rotatable vane shafts. A vane is provided on each shaft and a distal end of each shaft extends through the aperture. Follower members are connected to the distal ends of the shaft and extend generally parallel to the chord line of the vanes to control the pitch angle of the vanes. The second wheel is inset a selected distance from the first wheel and provides cams that extend outwardly from the second wheel to engage the follower members of the first wheel. A drive member is provided so that a rotational force applied to either wheel is transferred by a gear drive to the other wheel. Also, movement of the cams of the second wheel in the followers of the first wheel adjusts the pitch angle of the vanes during the rotation of the first and second wheels. Variable means adjust e offset between the axes of the first and second wheels whereby the relative pitch angle of the vanes and the degree of vane pitch angle variation with rotation can be changed.

7 Claims, 5 Drawing Sheets

FLUID ACTIVE DEVICE

BACKGROUND OF THE INVENTION

The present invention relates to fluid active and reactive devices and more particularly to devices which can be used to impel a fluid or to be impelled by a moving fluid.

The prior art is replete with fluid reactive devices including examples with a multiplicity of vanes, as are devices contemplated by the present invention.

The common squirrel cage fan and paddle wheels are examples of devices utilized to impel fluid. Turbines and the like are examples of multiple vane devices which are impelled by a fluid.

Other arrangements are known that include devices with various means for variation of blade pitch angles.

In general the optimum arrangement for a fluid reactive device is that the maximum blade surface be presented to the flowing fluid in the direction of rotation and that out of the direction of flow a minimum surface be presented to the flowing fluid.

With respect to fluid active devices the optimum condition is that the maximum vane area be located in the fluid in the direction of movement and likewise a minimum blade area be exposed out of the direction of movement.

While numerous prior art arrangements are known for both fluid active and fluid reactive devices none is known which presents the advantages of devices within the scope of the present invention.

SUMMARY OF THE INVENTION

Devices within the scope of the present invention are useful as impellers for movement by a fluid and for moving a fluid.

Devices within the scope of the present invention are straightforward and economical to assemble and operate with minimum complexity.

Further, devices within the scope of the present invention provide the advantages that the direction of the action of the vanes upon a fluid or the action of a moving fluid upon the vanes, depending upon the particular application contemplated, can be easily adjusted or even reversed by the expedient of the adjustment of rotational angle between wheels.

Likewise devices within the scope of the present invention can be produced in relatively large as well as small sizes and can be adapted to utilize selected numbers of vanes depending upon active or reactive surfaces and the particular application contemplated.

More particularly, the present invention provides a multiple vane variable pitch, fluid reactive device to move or be moved by a fluid including a first wheel, a second wheel each rotatable about an axis disposed with their axes in selective offset and parallel relation. Apertures are provided in the first wheel and adapted to receive rotatable vane shafts. Each vane extends outwardly from the first wheel and with the distal end of each shaft extending inwardly through the first wheel apertures. Follower members are attached, generally parallel to the chord line of the vanes and are used to control the relative pitch angle of the vanes. The second wheel, inset a selected distance from the first wheel includes attached cams that extend outwardly to engage the followers mounted to the vane shafts of the first wheel. A drive mechanism is provided so that a rotational force applied to either wheel will be transferred in degree and direction to the other wheel so that when the first and second wheels are turned the cams of the second wheel being received in the followers of the first wheel selectively adjust the relative pitch angle of the vane members and so the pitch angle of any particular vane at any particular point in the rotation cycle of the first and second wheels are determined by a fixed or adjustable rotational timing differential between the first and second wheels axis offset so that the relative pitch angle of the vanes and the degree of vane pitch angle variation with rotation can be changed by adjusting this rotational timing differential from a positive through zero to negative.

Examples of arrangements within the scope of the present invention are illustrated in the accompanying drawings and described hereinafter but it will be understood that neither the drawings provided nor the description of the drawings are by way of limitation and that other arrangements also within the scope of the present invention will occur to those skilled in the art upon reading the disclosure set forth hereinafter.

BRIEF DESCRIPTION OF THE DRAWINGS

Examples of arrangements within the scope of the present invention are shown in the accompanying figures wherein.

DETAILED DESCRIPTION OF THE DRAWINGS

Figure 1:
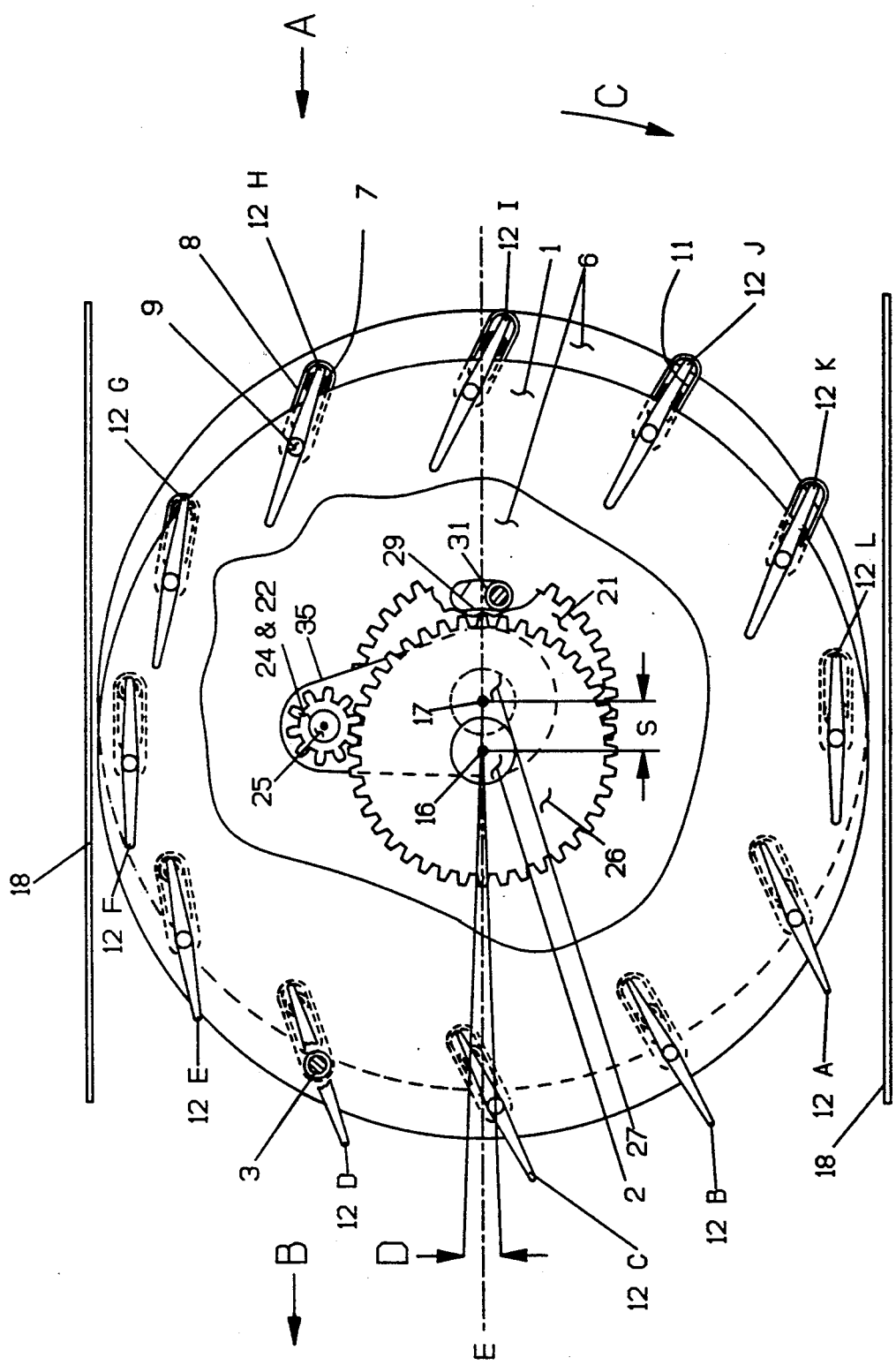
FIG. 1 is a view of an operating vane arrangement in a duct within the scope of the present invention.

Referring first to FIG. 1, two control wheels 1 and 6 are illustrated to operate a set of vanes. While this disclosure discusses vanes it will be understood it also comprehends other fluid reactive surfaces such as foils, or blades. Wheel 1 is adapted for operation on an axle shaft 2 and includes peripheral apertures 3. Each of the peripheral apertures 3 is adapted to receive a shaft 9 which carries a vane shown in FIG. 1 as vanes 12A through 12L. The second wheel 6 is adapted to receive cam followers 7 to be received in a slot 11 of a cam 8 where the cam 8 is fixed to the shaft 9 which extends through apertures 3 of wheel 1. In operation, shaft 9 pivots as described hereinafter to adjusts the angle of the vanes 12A through 12L as illustrated in response to the relative position of each slot 11 and cam follower 7.

The operation is illustrated in FIG. 1 where the pitch angle of each of the vanes 12A-12L is changed as wheels 1 and 6 rotate in the direction of arrow C. In the arrangement shown in FIG. 1 the entire vane assembly is located in a duct 18 where a fluid A flows through duct 18 to be impelled as the device turns, or to induce the device to turn, and thus fluid exits in the direction of arrow B.

Figure 2:
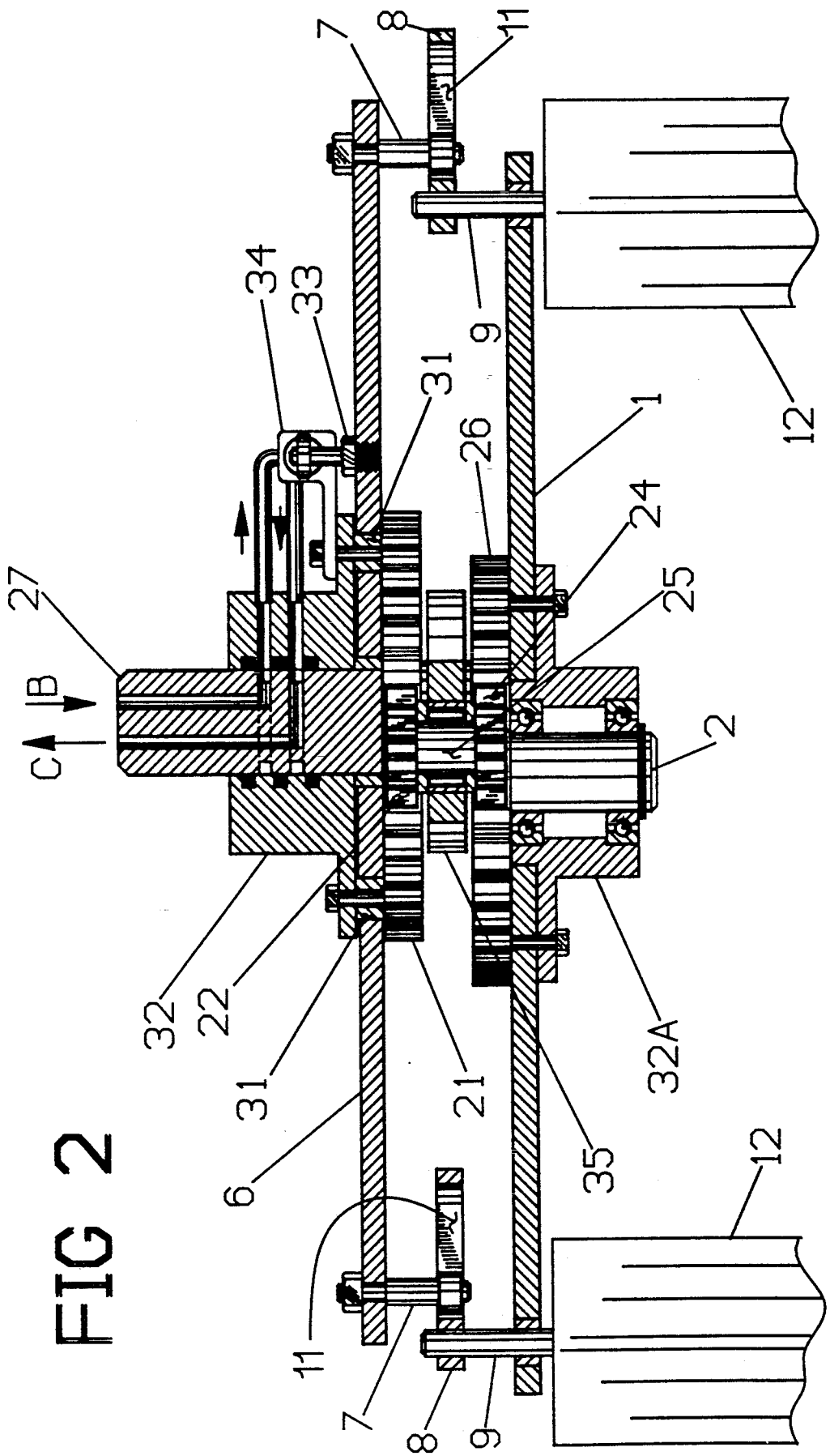
FIG. 2 is a top view of an operating arrangement of the type shown in FIG. 1 showing more clearly the timing gears and an example of a vane manipulating arrangement within the scope of the present invention.

Wheels 1 and 6 are offset a distance "S" as shown between the center lines 16 of the wheel 1 and the center line 17 of the wheel 6. The offset shown as distance S is determined by the method in which the two stationary axle shafts 27 and 2 as shown in FIGS. 1 and 2 are connected together to form an offset shaft as well as the capability of slot 11 in each cam 8 to accommodate the cam followers 7 as the follower travels between to the limits of slot 11 during each revolution of wheels 6 and 1. It will be understood that the attack angle of the vanes is determined by the distance "S" and that the smaller the distance "S" the greater the attack angle.

Gear 21 shown in FIGS. 1 and 2 is supported by a rotating hub 32 as shown in FIG. 2 which is supported by a stationary axle shaft 27 as shown in FIGS. 1 and 2. Referring to FIG. 2, as hub 32 rotates with the gear 21 it rotates the timing gear 22, shaft 25 and timing gear 24. Timing gears 22 and 24 are fixed to rotating shaft 25 which is carried by an adjustable swing arm 35 (FIGS. 1 and 2) which is rotatable about axis of gear 21 to allow the second timing gear 24 to accurately engage gear 26 on wheel 1 regardless of the controlled amount of offset S FIG. 1 between wheels 1 and 6. The swing arm 35 is then locked. The timing gears 22 and 24 keep both gears 21 and 26 in synchronization, that is the ratio of gear 24 to gear 26 is the same as the ratio of gear 22 to 21.

Figure 4:
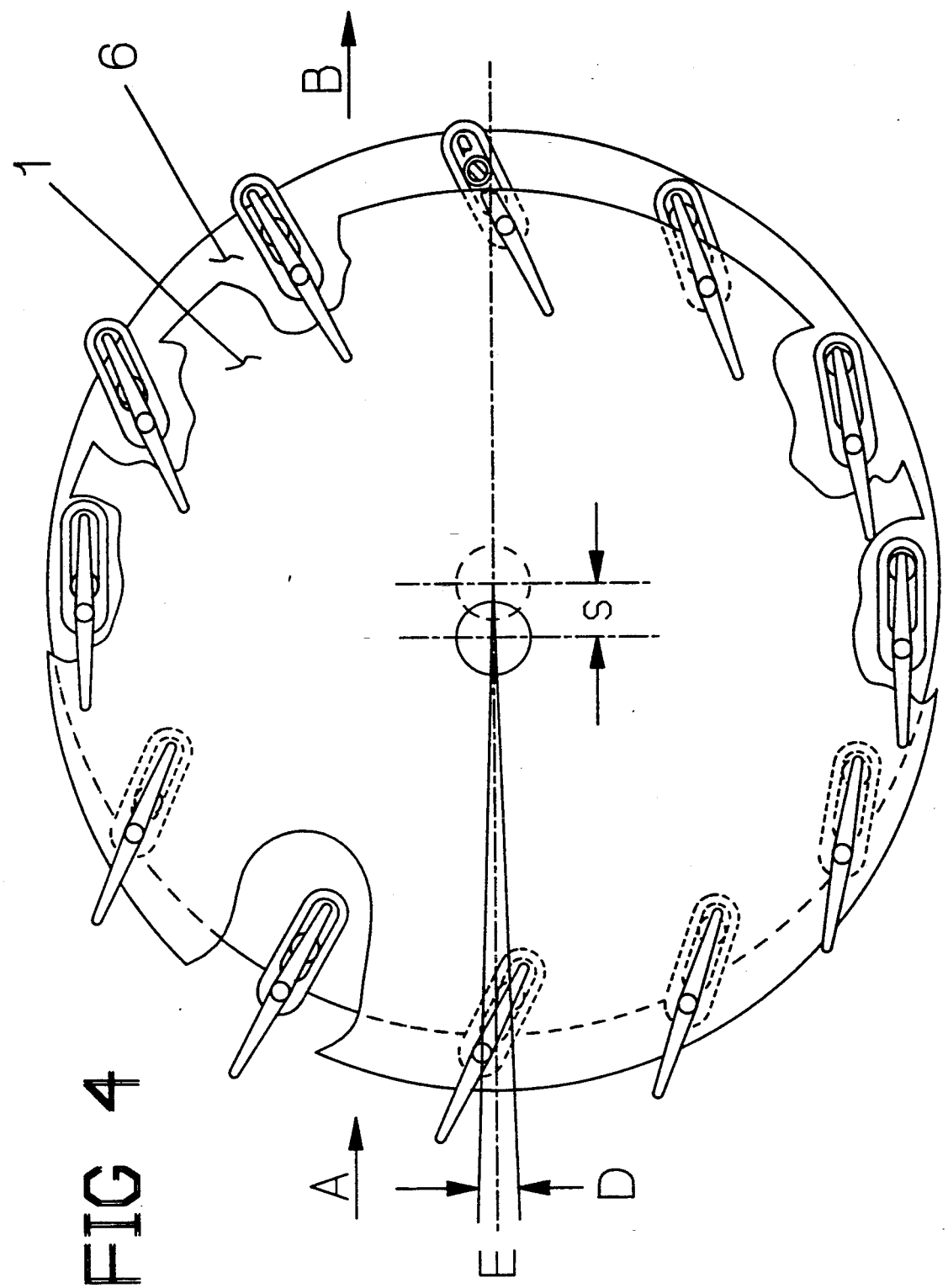
FIG. 4 is a view with the vane pitch attitude reversed from that shown in FIG. 1 to generate a reverse flow within the same clockwise rotation of the blades within the scope of the present invention.
Figure 5:
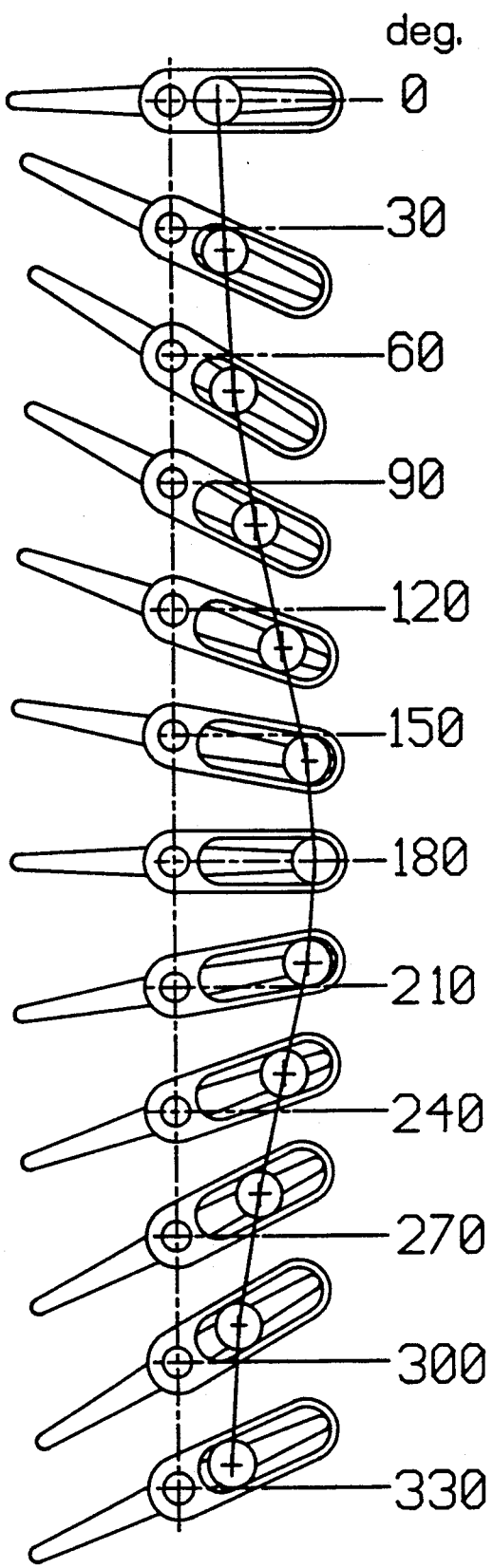
FIG. 5 is an illustration of the relative orientation of a vane as the wheels are rotated through a full circle.

Wheel 1 is fixed to gear 26 and hub 32A. Wheel 6 is advanced or retarded relative to the gear 21 and hub 32 as shown in FIG. 2. The advance and retard feature between wheels 1 and 6 permits the pitch angle of the vanes 12A-12L to be changed as wheel 6 is rotated through it's timing region, determined by the length of radial slots 29 in wheel 6, as shown in FIG. 1 about the axis of hub 32 as shown in FIG. 2. When the vanes are pitched in the angle D as shown in FIG. 1 the fluid is drawn in as shown by arrow A and expelled as shown by arrow B. The vanes at the 0° and 180° position as shown in FIGS. 4 and 5 are always in the zero relative pitch angle position. When the wheel 6 is retarded to a midpoint E between angle D as shown in FIGS. 1 and 4 all vanes are controlled to a zero relative pitch angle and fluid cannot be impelled to flow in either direction. When wheel 6 is retarded to an angle D as shown in FIG. 4 the vanes 12A-12L are pitched in the opposite direction of the vane pitch 12A-12L shown in FIG. 1 and the flow direction is that of arrows A and B as shown in FIG. 4, which is also reverse the flow direction A and B shown in FIG. 1. The vanes are variable in pitch depending on the rotational timing offset of wheel 6 to wheel 1 between in FIG. 1 and angle E shown 4.

Figure 3:
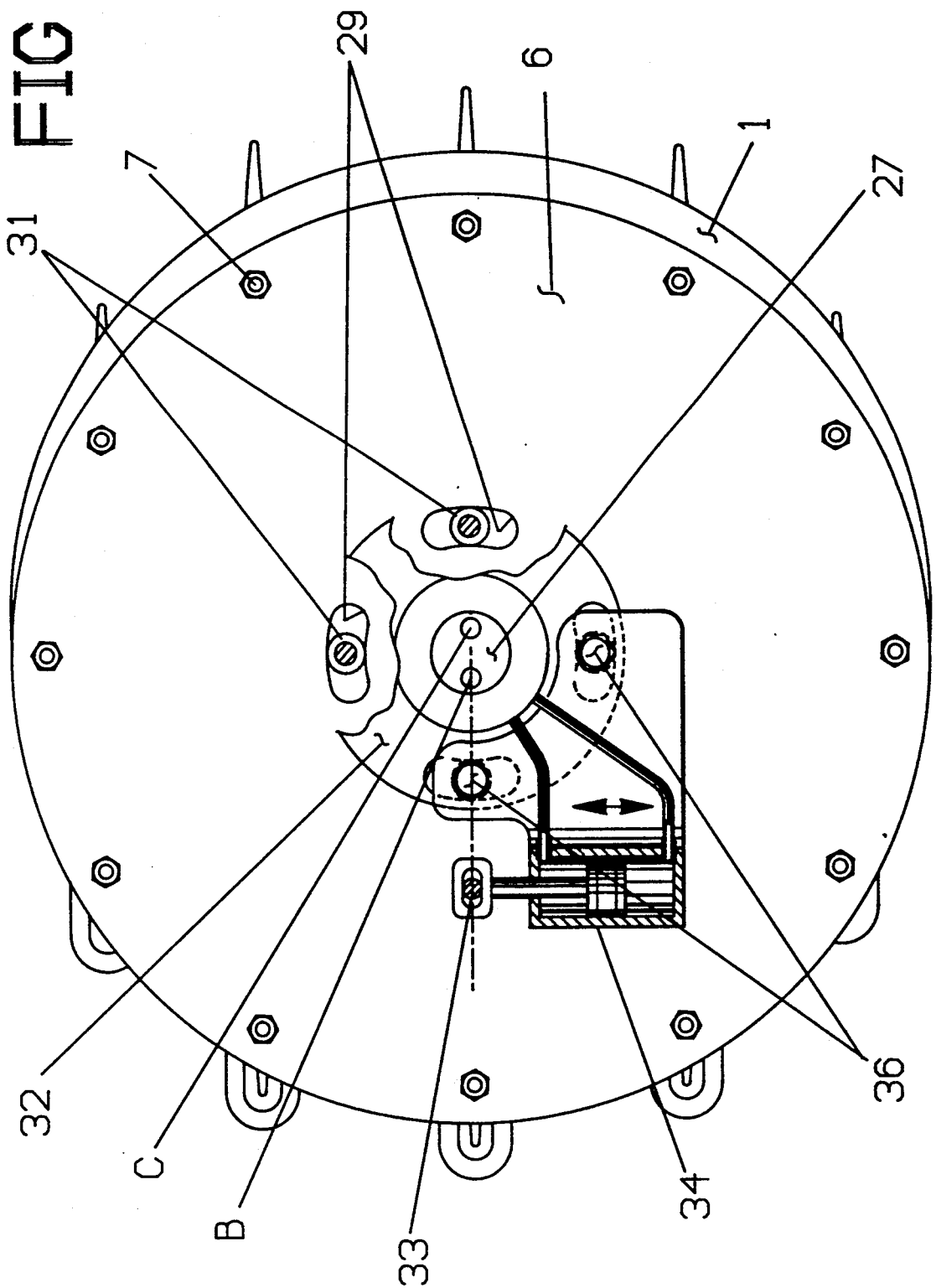
FIG. 3 is a 3rd angle projection view of FIG. 2 showing the hydraulic system that controls the pitch attitude of the vanes within the scope of the present invention.

Referring to FIGS. 2 and 3, the rotational timing relationship of wheel 1 to wheel 6 is controlled by a hydraulic cylinder 34 which is attached to hub 32 at points 36 shown in FIG. 3 with the rod end of cylinder is attached to wheel 6 at point 33 which is a protruding shaft from wheel 6 as shown in FIGS. 2 and 3. By energizing the hydraulic cylinder through ports B and C as shown in FIGS. 2 and 3 at the end of stationary shaft 27 as shown in FIGS. 2 and 3 the pressurized hydraulic fluid is passed through axle shaft 27 and through the sealed rotary joint in hub 32 and then to the hydraulic cylinder 34 providing means to advance or retard the pitch of the vanes while the wheel is in motion.

The degree to which wheel 6 can be advanced or retarded is controlled by the radial slots 29 as shown in FIGS. 1 and 3 in wheel 6 through which spacer bushings 31 as shown in FIGS. 1-3 are used to separate gear 21 shown in FIG. 2 from the hub 32 within the confines of the radial slots 29 as shown in FIGS. 1 and 3 preventing the cam follower 7 shown in FIG. 2 on wheel 6 from binding at either end of cam 8 slot 11 as shown in FIGS. 1 and 2.

FIG. 5 is an illustration of one example of the relative movement of a vane during a full rotation of wheels 1 and 6. As shown, the vane starts at a relative horizontal position at 0° then is tilted toward one angle between 0° and 180° where it again returns to horizontal. Tilting then occurs in the opposite direction from 0° to 360° where it is returned to a relative horizontal position. It will be understood that the foregoing relates to but one example of an arrangement within the scope of the present invention will occur to those skilled in the art upon reading the disclosure set forth hereinbefore.

The invention claimed is:

1. A multiple vane, variable pitch fluid active or reactive operating device including: first wheel means rotatable about a first axis and second wheel means rotatable about second axis where the first and second axes are adjustably offset in parallel relation; first aperture means in said first wheel means; first shaft means adapted to be pivotably received within said first aperture means; vane means at the distal end of said shaft means so said vane means extend outwardly from said shaft and outwardly from said first wheel means in generally parallel spaced relation with respect to the axis of said first wheel where said second wheel is inset a selected distance from said first wheel; cam means pivotably carried by said second wheel having cam surface means extending generally parallel to the plane of said vane means; follower means carried by said first wheel to engage said cam surface means whereby each said vane means is pivoted to selected pitch angles by rotation of said first and second wheels and travel of said follower means over said cam surface; drive means to permit a rotational force applied to one of said first and second wheels to be transferred to the other of said first and second wheels so that when wheels are turned said the pitch of any selected vane at any point in the rotation cycle of said wheels is determined by a reference rotational angle between said first and second wheel axes so the pitch variation with rotation can be adjusted by changing said reference rotational angle; and adjustment means to selectively adjust said reference rotational angle.

2. The invention of claim 1 wherein one of said first and second wheels is connected respectively to its shaft by adjustable hub means whereby said wheel can be selectively rotated through a selected angle relative to said shaft means.

3. The invention of claim 2 wherein the pitch angle of said vane means relative to a reference plane located in spaced parallel relation to the axis of one of said first and second wheels is adjusted by movement of said first or second wheel relative to said hub to adjust said selected angle of said shaft relative to said hub.

4. The invention of claim 2 including adjustment means to connect said hub to said wheel where said adjustment means rotates with said hub and wheel to allow selected adjustment of said selected angle between said hub and said shaft.

5. The invention of claim 2 wherein said angle is adjusted to cause fluid to be impelled by rotation of said first and second wheels.

6. The invention of claim 2 wherein said angle is adjusted to allow said wheels to be rotated by impingement of fluid on said vanes.

7. A multiple vane, variable pitch fluid operating device including: first wheel means pivotable about a first axis and second wheel means pivotable about a second axis where the first and second axes are in adjustably offset and parallel relation; aperture means in said first wheel means; shaft means adapted to be pivotably received within said aperture means; vane means at the distal end of said shaft means so said vane means extend outwardly from said shaft and outwardly from said first wheel means in generally parallel spaced relation with respect to the axis of said first wheel where said second wheel is inset a selected distance from said first wheel; cam means cooperatively, pivotably, carried by said second wheel having cam surface means extending generally parallel to the plane of said vane means; follower means carried by said first wheel to engage said cam surface means whereby each said vane means is pivoted to selected pitch angles by rotation of said first and second wheels and travel of said follower means travel over said cam surface; drive means to permit a rotational force applied to one of said first and second wheels to be transferred likewise in degree and direction to the other of said first and second wheels so that when said wheels are turned said drive means adjusts the pitch of said vane members and pitch of any selected vane at any point in the rotation cycle in said wheels is determined by a reference rotational angle between said first and second wheel axes so the pitch variation with rotation can be adjusted by changing said reference rotational angle; and adjustment means to selectively adjust said reference rotational angle wherein said drive means is a gear train having first gear means on said first wheel and second gear means on said second wheel and transfer gear means to engage said first and second gear means to transfer rotation of one of said first and second gear means to the other at a 1:1 ratio.

* * * * *